US 8,127,619 B2

(12) United States Patent
Hammerschmidt

(10) Patent No.: US 8,127,619 B2
(45) Date of Patent: *Mar. 6, 2012

(54) PRESSURE SENSOR INCLUDING SWITCHABLE SENSOR ELEMENTS

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/038,923

(22) Filed: Mar. 2, 2011

(65) Prior Publication Data

US 2011/0146410 A1    Jun. 23, 2011

Related U.S. Application Data

(63) Continuation of application No. 12/355,345, filed on Jan. 16, 2009, now Pat. No. 7,926,353.

(51) Int. Cl.
*G01L 9/00* (2006.01)

(52) U.S. Cl. .................. 73/754; 73/720; 73/726

(58) Field of Classification Search .............. None
See application file for complete search history.

(56) References Cited

U.S. PATENT DOCUMENTS

| 4,320,664 | A  | 3/1982  | Rehn et al.       |
|-----------|----|---------|-------------------|
| 6,142,021 | A  | 11/2000 | Ross et al.       |
| 6,357,298 | B1 | 3/2002  | Draxelmayr et al. |
| 7,415,885 | B2 | 8/2008  | Reinwald et al.   |
| 2008/0041164 | A1 | 2/2008 | Cottles et al.    |
| 2008/0223143 | A1 | 9/2008 | Murari et al.     |

OTHER PUBLICATIONS

Office Action mailed Jun. 21, 2010 in U.S. Appl. No. 12/355,345.

*Primary Examiner* — Andre Allen
(74) *Attorney, Agent, or Firm* — Dicke, Billig & Czaja, PLLC

(57) ABSTRACT

A semiconductor device includes a first sensor element in a first branch of a Wheatstone bridge and a second sensor element in a second branch of the Wheatstone bridge. The semiconductor device includes a first reference element in the first branch and a second reference element in the second branch. The semiconductor device includes a circuit configured to switch the first sensor element to the second branch and the second sensor element to the first branch.

21 Claims, 5 Drawing Sheets

PRESSURE SENSOR INCLUDING SWITCHABLE SENSOR ELEMENTS

CROSS-REFERENCE TO RELATED APPLICATIONS

This Utility Patent Application is a continuation application of U.S. application Ser. No. 12/355,345, filed Jan. 16, 2009, which is incorporated herein by reference.

BACKGROUND

Pressure sensors are typically used to measure the pressure of a liquid or a gas, such as air. Pressure sensors typically provide an output signal that varies based on the pressure sensed by the pressure sensor. To test a pressure sensor to verify that it is operating correctly, the pressure sensor is typically removed from a normal operating mode such that pressure measurements cannot be obtained during the testing procedure.

For these and other reasons, there is a need for the present invention.

SUMMARY

One embodiment provides a semiconductor device. The semiconductor device includes a first sensor element in a first branch of a Wheatstone bridge and a second sensor element in a second branch of the Wheatstone bridge. The semiconductor device includes a first reference element in the first branch and a second reference element in the second branch. The semiconductor device includes a circuit configured to switch the first sensor element to the second branch and the second sensor element to the first branch.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
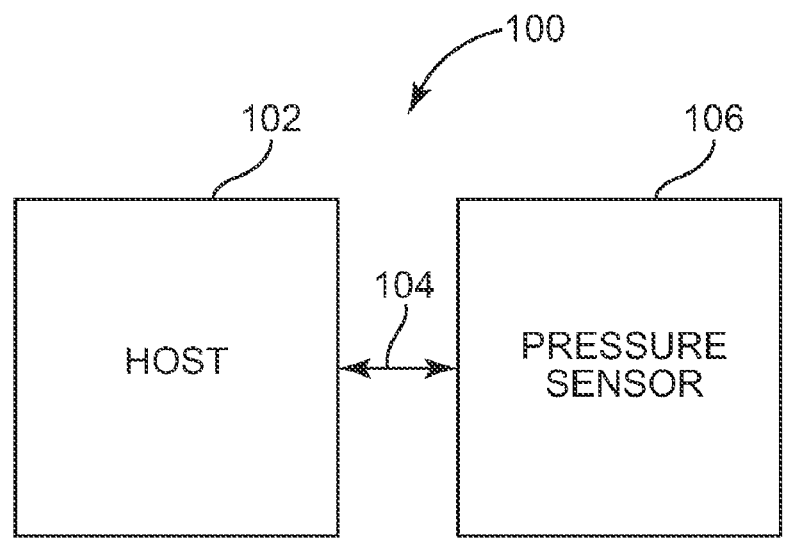
FIG. 1 is a block diagram illustrating one embodiment of a system.

FIG. 1 is a block diagram illustrating one embodiment of a system 100. System 100 includes a host 102 and a pressure sensor 106. Host 102 is communicatively coupled to pressure sensor 106 through communication link 104. Host 102 includes a microprocessor, computer, controller, or any other suitable device for receiving data from pressure sensor 106. Pressure sensor 106 communicates pressure data to host 102 though communication link 104. In one embodiment, communication link 104 is a wireless communication link.

In one embodiment, pressure sensor 106 is a semiconductor device. Pressure sensor 106 includes an array of switchable pressure sensor elements and reference elements. In one embodiment, the pressure sensor elements and reference elements are switched to provide a Wheatstone bridge configuration for sensing an applied pressure. The pressure sensor elements and the reference elements can be switched between a first branch and a second branch of the Wheatstone bridge and between an upper portion and a lower portion of the Wheatstone bridge. The switching is performed while the pressure sensor is online and sensing an applied pressure. By monitoring the output of the pressure sensor and the switched state of the pressure sensor elements and reference elements, failed pressure sensor elements and failed reference elements can be identified. Therefore, pressure sensor 106 does not need to be taken offline to perform a test to verify whether the pressure sensor is operating correctly.

In one embodiment, each pressure sensor element is micromachined and includes a diaphragm and sensor elements to detect movement of the diaphragm in response to an applied pressure. The sensor elements include capacitive elements, piezo resistor elements, or other suitable sensor elements for detecting movement of the diaphragm. The reference elements are micromachined to match the pressure sensor elements, however, the diaphragms of the reference elements are fixed such that the sensor elements of the reference elements provide a constant value independent of the applied pressure.

As used herein, the term "electrically coupled" is not meant to mean that the elements must be directly coupled together and intervening elements may be provided between the "electrically coupled" elements.

Figure 2:
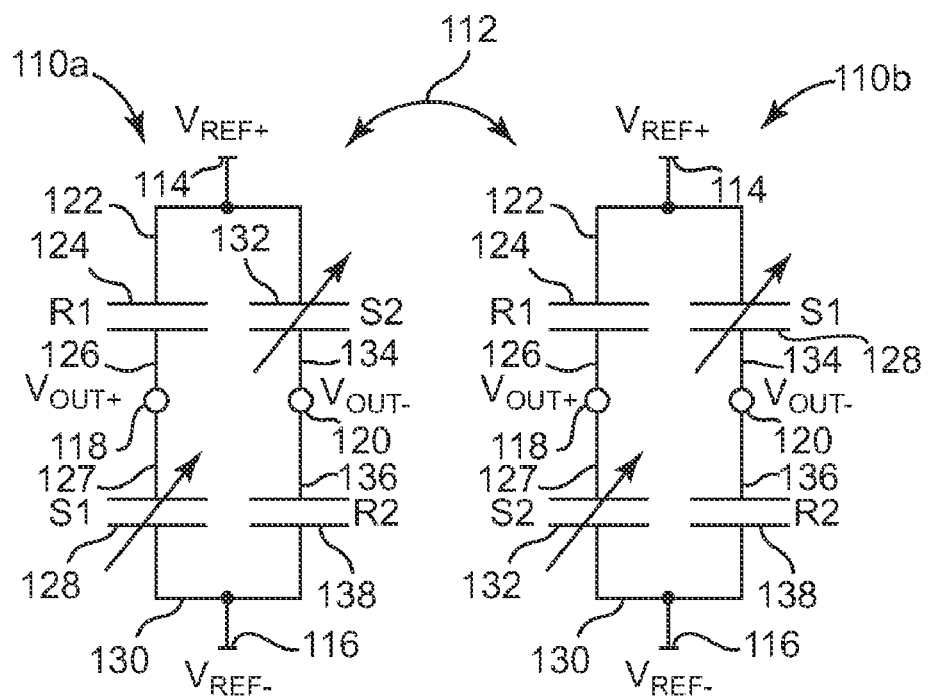
FIG. 2 is a diagram illustrating one embodiment of a pressure sensor in two different states for online monitoring of the pressure sensor.

FIG. 2 is a diagram illustrating one embodiment of a pressure sensor 110 in two different states 110a and 110b for online monitoring of pressure sensor 110. In one embodiment, pressure sensor 110 provides pressure sensor 106 previously described and illustrated with reference to FIG. 1. Pressure sensor 110 includes a first reference element (R1) 124, a second reference element (R2) 138, a first sensor element (S1) 128, and a second sensor element (S2) 132. First reference element 124 is substantially identical to second reference element 138. First sensor element 128 is substantially identical to second sensor element 132.

In one embodiment, first sensor element 128 and second sensor element 132 are micromachined pressure sensor cells including diaphragms that deflect in response to applied pressure. First sensor element 128 and second sensor element 132 include capacitive sensor elements, piezo resistor sensor elements, or other suitable sensor elements for sensing the deflection of the diaphragm. In one embodiment, first sensor element 128 and second sensor element 132 have a capacitance that varies in response to the applied pressure.

In one embodiment, first reference element 124 and second reference element 138 are fabricated using the same micromachining process used to fabricate first sensor element 128 and second sensor element 132. First reference element 124 and second reference element 138, however, include an oxide pillar below the diaphragm that prevents the diaphragm from deflecting under an applied pressure. In one embodiment, first reference element 124 and second reference element 138 have a constant capacitance independent of applied pressure.

In state 110a, one side of first reference element 124 is electrically coupled to a first or positive reference voltage ($V_{REF+}$) 114 through signal path 122. The other side of first reference element 124 is electrically coupled to a first or positive voltage output ($V_{OUT+}$) node 118 through signal path 126. $V_{OUT+}$ node 118 is electrically coupled to one side of first sense element 128 through signal path 127. The other side of first sense element 128 is electrically coupled to a second or negative reference voltage ($V_{REF-}$) 116 through signal path 130. First reference element 124 and first sensor element 128 provide the left or first branch of the Wheatstone bridge.

One side of second sensor element 132 is electrically coupled to $V_{REF+}$ 114 through signal path 122. The other side of second sensor element 132 is electrically coupled to a second or negative voltage output ($V_{OUT-}$) node 120 through signal path 134. $V_{OUT-}$ node 120 is electrically coupled to one side of second reference element 138 through signal path 136. The other side of second reference element 138 is electrically coupled to $V_{REF-}$ 116 through signal path 130. Second sensor element 132 and second reference element 138 provide the right or second branch of the Wheatstone bridge.

First sensor element 128 and second sensor element 132 are arranged diagonally in the first and second branch of the Wheatstone bridge with first sensor element 128 in the lower portion of the Wheatstone bridge and second sensor element 132 in the upper portion of the Wheatstone bridge. As the applied pressure on first sensor element 128 increases, the capacitance increases and therefore the voltage increases at $V_{OUT+}$ node 118. As the applied pressure on second sensor element 132 increases, the capacitance increases and therefore the voltage decreases at $V_{OUT-}$ node 120. As such, there is an increase in the bridge voltage between $V_{OUT+}$ node 118 and $V_{OUT-}$ node 120 as the applied pressure on first sensor element 128 and second sensor element 132 increases. There is a decrease in the bridge voltage between $V_{OUT+}$ node 118 and $V_{OUT-}$ node 120 as the applied pressure on first sensor element 128 and second sensor element 132 decreases.

In state 110b, one side of first reference element 124 is electrically coupled to $V_{REF+}$ 114 through signal path 122. The other side of first reference element 124 is electrically coupled to $V_{OUT+}$ node 118 through signal path 126. $V_{OUT+}$ node 118 is electrically coupled to one side of second sense element 132 through signal path 127. The other side of second sense element 132 is electrically coupled to $V_{REF-}$ 116 through signal path 130. First reference element 124 and second sensor element 132 provide the first branch of the Wheatstone bridge.

One side of first sensor element 128 is electrically coupled to $V_{REF+}$ 114 through signal path 122. The other side of first sensor element 128 is electrically coupled to $V_{OUT-}$ node 120 through signal path 134. $V_{OUT-}$ node 120 is electrically coupled to one side of second reference element 138 through signal path 136. The other side of second reference element 138 is electrically coupled to $V_{REF-}$ 116 through signal path 130. First sensor element 128 and second reference element 138 provide the second branch of the Wheatstone bridge.

During operation, pressure sensor 110 is periodically switched between state 110a and 110b as indicated at 112. The bridge voltage between $V_{OUT+}$ node 118 and $V_{OUT-}$ node 120 should remain substantially the same between state 110a and 110b if the applied pressure to sensor elements 128 and 132 remains constant. If the bridge voltage remains substantially the same between states, pressure sensor 110 is functioning correctly. If the bridge voltage does not remain substantially the same between state 110a and 110b, pressure sensor 110 has failed. The failure of pressure sensor 110 is due to the failure of sensor element 128 and/or 132.

In another embodiment, first reference element 124 and second reference element 138 are periodically switched between the first and second branch of the Wheatstone bridge in a similar manner as first sensor element 128 and second sensor element 132. The bridge voltage between $V_{OUT+}$ node 118 and $V_{OUT-}$ node 120 should remain substantially the same between the two states if the applied pressure to sensor elements 128 and 132 remains constant. If the bridge voltage remains substantially the same between states, pressure sensor 110 is functioning correctly. If the bridge voltage does not remain substantially the same between the two states, pressure sensor 110 has failed. The failure of pressure sensor 110 in this case is due to the failure of reference element 124 and/or 138.

Figure 3:
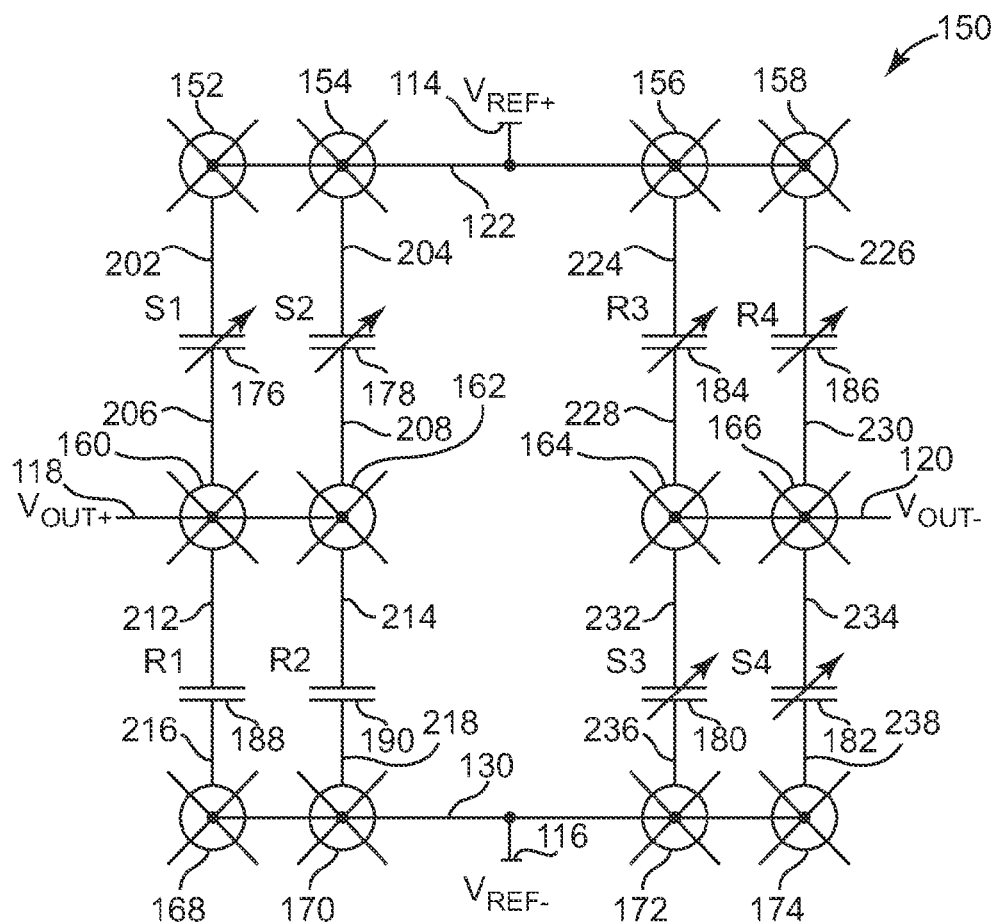
FIG. 3 is a diagram illustrating another embodiment of a pressure sensor.

FIG. 3 is a diagram illustrating another embodiment of a pressure sensor 150. In one embodiment, pressure sensor 150 provides pressure sensor 106 previously described and illustrated with reference to FIG. 1. Pressure sensor 150 includes switch matrixes 152, 154, 156, 158, 160, 162, 164, 166, 168, 170, 172, and 174, sensor elements 176, 178, 180, and 182, and reference elements 184, 186, 188, and 190. The switch matrixes enable each sensor element and each reference element to be switched into each position in the Wheatstone bridge including the first and second branch and the upper and lower portion of the Wheatstone bridge.

Switch matrix 152 is electrically coupled to one side of first sensor element (S1) 176 through signal path 202. The other side of first sensor element 176 is electrically coupled to switch matrix 160 through signal path 206. Switch matrix 152 selectively electrically couples one side of first sensor element 176 to $V_{REF+}$ 114 or $V_{REF-}$ 116. Switch matrix 160 selectively electrically couples the other side of first sensor element 176 to $V_{OUT+}$ node 118 or $V_{OUT-}$ node 120.

Switch matrix 154 is electrically coupled to one side of second sensor element (S2) 178 through signal path 204. The other side of second sensor element 178 is electrically coupled to switch matrix 162 through signal path 208. Switch matrix 154 selectively electrically couples one side of second sensor element 178 to $V_{REF+}$ 114 or $V_{REF-}$ 116. Switch matrix 162 selectively electrically couples the other side of second sensor element 178 to $V_{OUT+}$ node 118 or $V_{OUT-}$ node 120.

Switch matrix 156 is electrically coupled to one side of third reference element (R3) 184 through signal path 224. The other side of third reference element 184 is electrically coupled to switch matrix 164 through signal path 228. Switch matrix 156 selectively electrically couples one side of third reference element 184 to $V_{REF+}$ 114 or $V_{REF-}$ 116. Switch matrix 164 selectively electrically couples the other side of third reference element 184 to $V_{OUT+}$ node 118 or $V_{OUT-}$ node 120.

Switch matrix 158 is electrically coupled to one side of fourth reference element (R4) 186 through signal path 226. The other side of fourth reference element 186 is electrically coupled to switch matrix 166 through signal path 230. Switch matrix 158 selectively electrically couples one side of fourth reference element 186 to $V_{REF+}$ 114 or $V_{REF-}$ 116. Switch matrix 166 selectively electrically couples the other side of fourth reference element 186 to $V_{OUT+}$ node 118 or $V_{OUT-}$ node 120.

Switch matrix 160 is electrically coupled to one side of first reference element (R1) 188 through signal path 212. The other side of first reference element 188 is electrically coupled to switch matrix 168 through signal path 216. Switch matrix 160 selectively electrically couples one side of first reference element 188 to $V_{OUT+}$ node 118 or $V_{OUT-}$ node 120. Switch matrix 168 selectively electrically couples the other side of first reference element 188 to $V_{REF+}$ 114 or $V_{REF-}$ 116.

Switch matrix 162 is electrically coupled to one side of second reference element (R2) 190 through signal path 214. The other side of second reference element 190 is electrically coupled to switch matrix 170 through signal path 218. Switch matrix 162 selectively electrically couples one side of second reference element 190 to $V_{OUT+}$ node 118 or $V_{OUT-}$ node 120. Switch matrix 170 selectively electrically couples the other side of second reference element 190 to $V_{REF+}$ 114 or $V_{REF-}$ 116.

Switch matrix 164 is electrically coupled to one side of third sensor element (S3) 180 through signal path 232. The other side of third sensor element 180 is electrically coupled to switch matrix 172 through signal path 236. Switch matrix 164 selectively electrically couples one side of third sensor element 180 to $V_{OUT+}$ node 118 or $V_{OUT-}$ node 120. Switch matrix 172 selectively electrically couples the other side of third sensor element 180 to $V_{REF+}$ 114 or $V_{REF-}$ 116.

Switch matrix 166 is electrically coupled to one side of fourth sensor element (S4) 182 through signal path 234. The other side of fourth sensor element 182 is electrically coupled to switch matrix 174 through signal path 238. Switch matrix 166 selectively electrically couples one side of fourth sensor element 182 to $V_{OUT+}$ node 118 or $V_{OUT-}$ node 120. Switch matrix 174 selectively electrically couples the other side of fourth sensor element 182 to $V_{REF+}$ 114 or $V_{REF-}$ 116.

Figure 4:
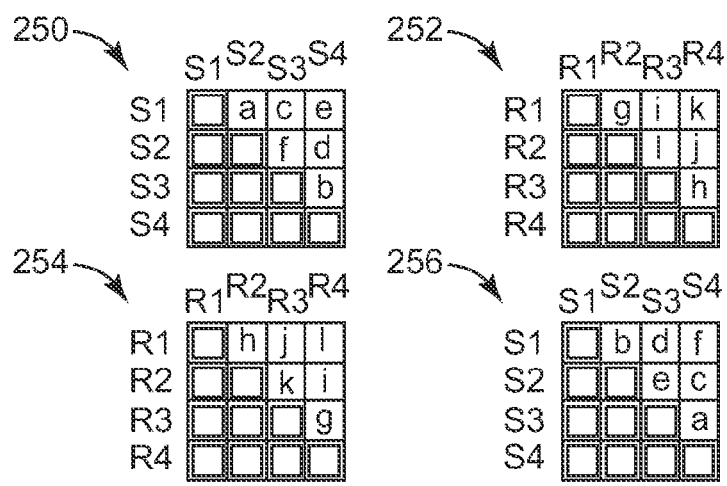
FIG. 4 illustrates four tables indicating one embodiment of states of the pressure sensor illustrated in FIG. 3.

FIG. 4 illustrates four tables 250, 252, 254, and 256 indicating one embodiment of states of pressure sensor 150 illustrated in FIG. 3. Table 250 illustrates states for the upper portion of the left or first branch of the Wheatstone bridge. Table 252 illustrates states for the upper portion of the right or second branch of the Wheatstone bridge. Table 254 illustrates states for the lower portion of the first branch of the Wheatstone bridge. Table 256 illustrates states for the lower portion of the second branch of the Wheatstone bridge.

The combinations of sensor elements 176, 178, 180, and 182 are indicated by "a" through "f" in tables 250 and 256. Each combination identifies two sensor elements that are in parallel with each other. For example, for combination "b" third sensor element 180 and fourth sensor element 182 are in parallel in the upper portion of the first branch of the Wheatstone bridge and first sensor element 176 and second sensor element 178 are in parallel in the lower portion of the second branch of the Wheatstone bridge. The combinations of reference elements 184, 186, 188, and 190 are indicated by "g" through "l" in tables 252 and 254. Each combination identifies two reference elements that are in parallel with each other. For example, for combination "i" second reference element 190 and fourth reference element 186 are in parallel in the lower portion of the first branch of the Wheatstone bridge and first reference element 188 and third reference element 184 are in parallel in the upper portion of the second branch of the Wheatstone bridge.

The particular state of pressure sensor 150 illustrated in FIG. 3 is indicated by combinations "a" and "h". For example, in this "a" and "h" state, $V_{REF+}$ 114 is electrically coupled to one side of first sensor element 176 through switch matrix 152 and signal paths 122 and 202. $V_{REF+}$ 114 is electrically coupled to one side of second sensor element 178 through switch matrix 154 and signal paths 122 and 204. $V_{REF+}$ 114 is electrically coupled to one side of third reference element 184 through switch matrix 156 and signal paths 122 and 224. $V_{REF+}$ 114 is electrically coupled to one side of fourth reference element 186 through switch matrix 158 and signal paths 122 and 226. The other side of first sensor element 176 is electrically coupled to $V_{OUT+}$ node 118 through signal path 206 and switch matrix 160. The other side of second sensor element 178 is electrically coupled to $V_{OUT+}$ node 118 through signal path 208 and switch matrix 162. The other side of third reference element 184 is electrically coupled to $V_{OUT-}$ node 120 through signal path 228 and switch matrix 164. The other side of fourth reference element 186 is electrically coupled to $V_{OUT-}$ node 120 through signal path 230 and switch matrix 166.

Also in this "a" and "h" state, $V_{REF-}$ 116 is electrically coupled to one side of first reference element 188 through switch matrix 168 and signal paths 130 and 216. $V_{REF-}$ 116 is electrically coupled to one side of second reference element 190 through switch matrix 170 and signal paths 130 and 218. $V_{REF-}$ 116 is electrically coupled to one side of third sensor element 180 through switch matrix 172 and signal paths 130 and 236. $V_{REF-}$ 116 is electrically coupled to one side of fourth sensor element 182 through switch matrix 174 and signal paths 130 and 238. The other side of first reference element 188 is electrically coupled to $V_{OUT+}$ node 118 through signal path 212 and switch matrix 160. The other side of second reference element 190 is electrically coupled to $V_{OUT+}$ node 118 through signal path 214 and switch matrix 162. The other side of third sensor element 180 is electrically coupled to $V_{OUT-}$ node 120 through signal path 232 and switch matrix 164. The other side of fourth sensor element 182 is electrically coupled to $V_{OUT-}$ node 120 through signal path 234 and switch matrix 166.

By sequencing through each of the combinations "a" through "f" and "g" through "l" by controlling the switch matrixes, each sensor element and each reference element can be tested to determine if the sensor element or reference element has failed. Each combination of "a" through "f" can be combined with each combination of "f" through "g". The sequencing is performed with pressure sensor 150 online and operating to provide an output signal indicating the applied pressure. Therefore, pressure sensor 150 does not have to be taken offline for testing.

Figure 5:
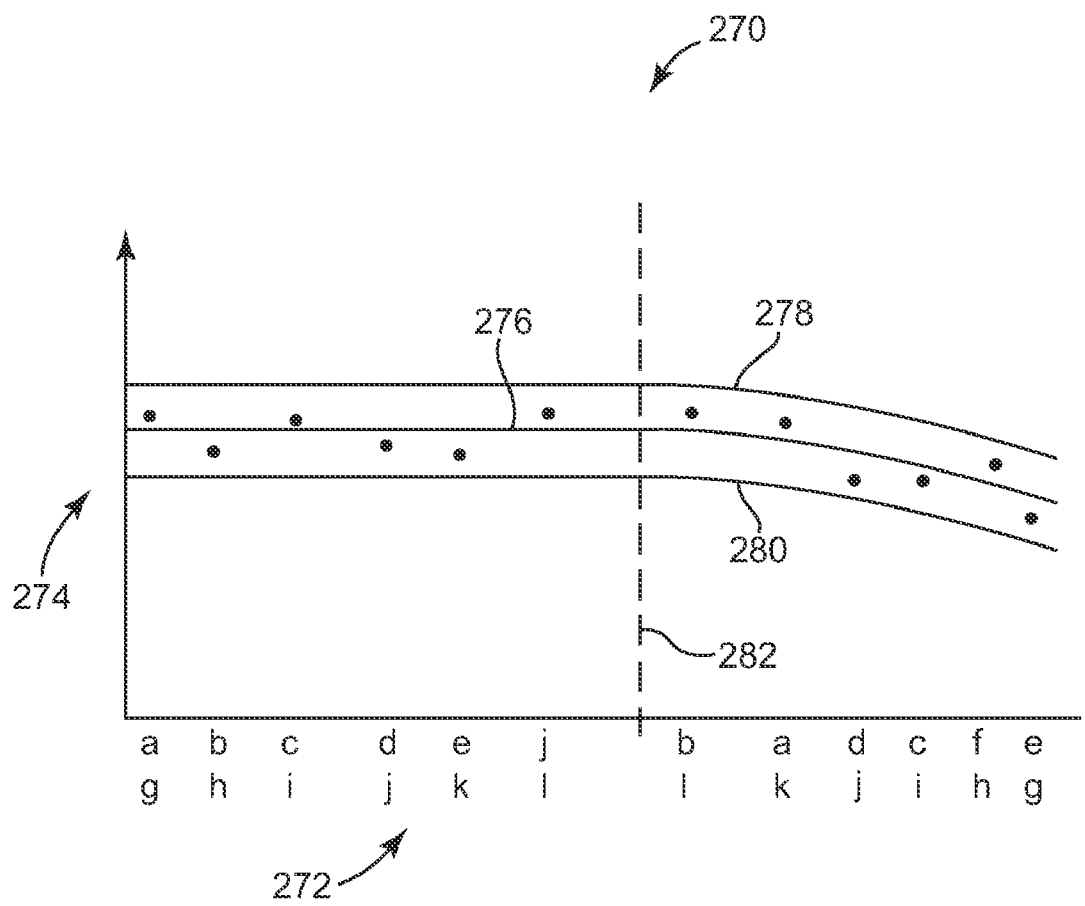
FIG. 5 is a chart illustrating one embodiment of sample output data for the pressure sensor illustrated in FIG. 3.

FIG. 5 is a chart 270 illustrating one embodiment of sample output data for pressure sensor 150 illustrated in FIG. 3. Chart 270 includes different states of pressure sensor 150 on x-axis 272 and applied pressure on y-axis 274. Pressure sensor 150 sequences through the combinations as indicated for example by "ag", "bh", "ci", etc. At 282, the order and combinations change as indicated for example by "bl", "ak", "dj", etc. In other embodiments, the states of pressure sensor 150 are sequenced in another suitable order and include other suitable combinations of "a" through "f" and "g" through "l".

Line 276 indicates the average value for the sample data points. Line 278 indicates an upper tolerance limit above the average value indicated by line 276 and line 280 indicates a lower tolerance limit below the average value indicated by line 276. If a data point is above upper tolerance limit 278 or below lower tolerance limit 280, the sensor element or reference element that was last switched is identified as failed. If a data point is below upper tolerance limit 278 and above lower tolerance limit 280, the sensor element or reference element that was last switched is identified as operating correctly. At 282 the pressure readings decrease, which decreases the average value indicated by line 276. The upper tolerance limit indicated by line 278 and the lower tolerance limit indicated by line 280 track the average value indicated by line 276. In this way, pressure sensor 150 is tested online during operation.

Figure 6:
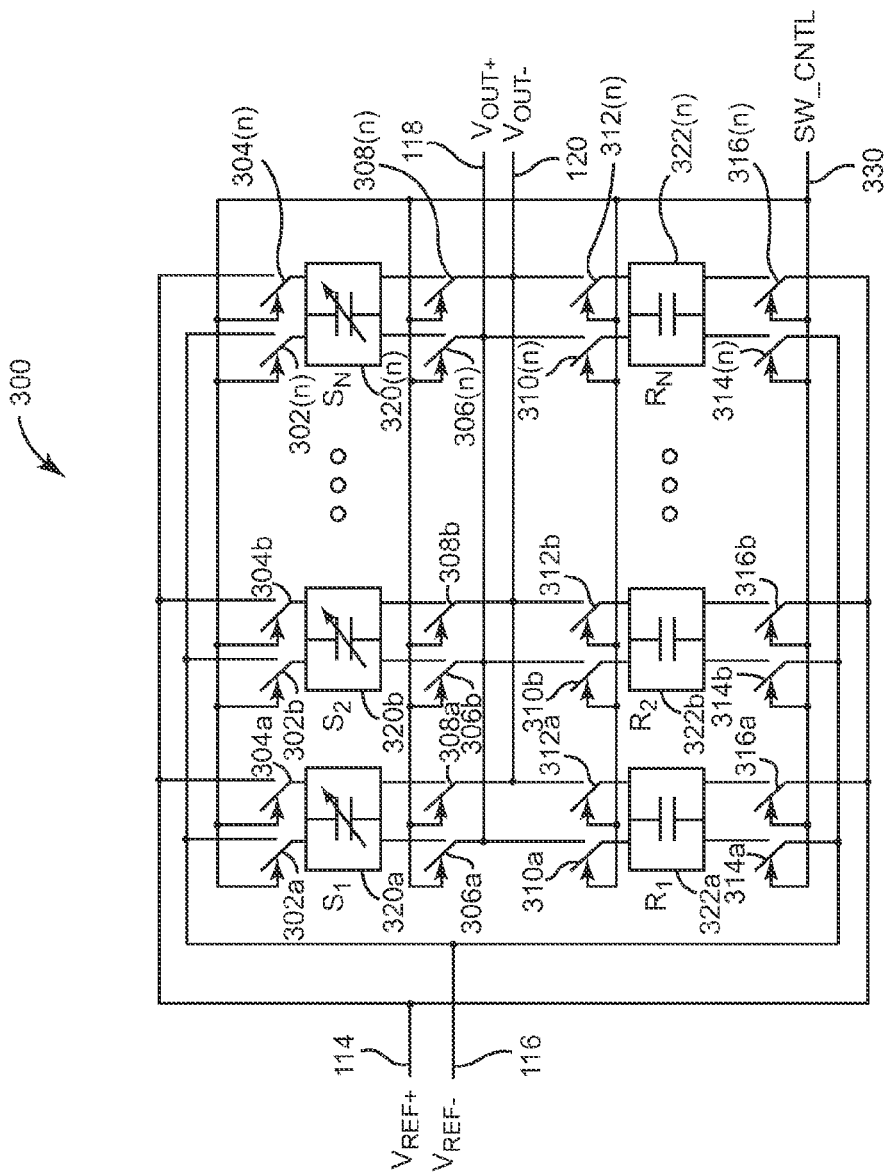
FIG. 6 is a diagram illustrating another embodiment of a pressure sensor.

FIG. 6 is a diagram illustrating another embodiment of a pressure sensor 300. In one embodiment, pressure sensor 300 provides pressure sensor 106 previously described and illustrated with reference to FIG. 1. Pressure sensor 300 includes an array of sensor elements ($S_1$-$S_N$) 320a-320(n), an array of reference elements ($R_1$-$R_N$) 322a-322(n), and switches 302a-302(n), 304a-304(n), 306a-306(n), 308a-308(n), 310a-310(n), 312a-312(n), 314a-314(n), and 316a-316(n), where "n" is a suitable number of elements.

One side of each switch 302a-302(n) is electrically coupled to $V_{REF-}$ 116. The other side of each switch 302a-302(n) is electrically coupled to one side of sensor element 320a-320(n), respectively. One side of each switch 304a-304(n) is electrically coupled to $V_{REF+}$ 114. The other side of each switch 304a-304(n) is electrically coupled to one side of sensor element 320a-320(n), respectively. The other side of each sensor element 320a-320(n) is electrically coupled to one side of switch 306a-306(n), respectively, and one side of switch 308a-308(n), respectively. The other side of each switch 306a-306(n) is electrically coupled to $V_{OUT+}$ node 118. The other side of each switch 308a-308(n) is electrically coupled to $V_{OUT-}$ node 120.

One side of each switch 310a-310(n) is electrically coupled to $V_{OUT+}$ node 118. The other side of each switch 310a-310(n) is electrically coupled to one side of reference element 322a-322(n), respectively. One side of each switch 312a-312(n) is electrically coupled to $V_{OUT-}$ node 120. The other side of each switch 312a-312(n) is electrically coupled to one side of reference element 322a-322(n), respectively. The other side of each reference element 322a-322(n) is electrically coupled to one side of switch 314a-314(n), respectively, and one side of switch 316a-316(n), respectively. The other side of each switch 314a-314(n) is electrically coupled to $V_{REF-}$ 116. The other side of each switch 316a-316(n) is electrically coupled to $V_{REF+}$ 114. The control input of each switch 302a-302(n), 304a-304(n), 306a-306(n), 308a-308(n), 310a-310(n), 312a-312(n), 314a-314(n), and 316a-316(n) is electrically coupled to switch control bus (SW_CNTL) 330.

Switches 302a-302(n) are controlled by signals on switch control bus 330 to connect or disconnect each sensor element 320a-320(n) to $V_{REF-}$ 116, respectively. Switches 304a-304(n) are controlled by signals on switch control bus 330 to connect or disconnect each sensor element 320a-320(n) to $V_{REF+}$ 114, respectively. For each sensor element 320a-320(n), one of switches 302a-302(n) and 304a-304(n) is turned on and one is turned off, respectively. In this way, each sensor element 320a-320(n) can be switched to the upper or lower portion of the Wheatstone bridge.

Switches 306a-306(n) are controlled by signals on switch control bus 330 to connect or disconnect each sensor element 320a-320(n) to $V_{OUT+}$ node 118, respectively. Switches 308a-308(n) are controlled by signals on switch control bus 330 to connect or disconnect each sensor element 320a-320(n) to $V_{OUT-}$ node 120, respectively. For each sensor element 320a-320(n), one of switches 306a-306(n) and 308a-308(n) is turned on and one is turned off, respectively. In this way, each sensor element 320a-320(n) can be switched to the left or right branch of the Wheatstone bridge.

Switches 310a-310(n) are controlled by signals on switch control bus 330 to connect or disconnect each reference element 322a-322(n) to $V_{OUT+}$ node 118, respectively. Switches 312a-312(n) are controlled by signals on switch control bus 330 to connect or disconnect each reference element 322a-322(n) to $V_{OUT-}$ node 120, respectively. For each reference element 322a-322(n), one of switches 310a-310(n) and 312a-312(n) is turned on and one is turned off, respectively. In this way, each reference element 322a-322(n) can be switched to the right or left branch of the Wheatstone bridge.

Switches 314a-314(n) are controlled by signals on switch control bus 330 to connect or disconnect each reference element 322a-322(n) to $V_{REF-}$ 116, respectively. Switches 316a-316(n) are controlled by signals on switch control bus 330 to connect or disconnect each reference element 322a-322(n) to $V_{REF+}$ 114, respectively. For each reference element 322a-322(n), one of switches 314a-314(n) and 316a-316(n) is turned on and one is turned off, respectively. In this way, each reference element 322a-322(n) can be switched to the upper or lower portion of the Wheatstone bridge.

During operation, control signals are applied to switches 302a-302(n), 304a-304(n), 306a-306(n), 308a-308(n), 310a-310(n), 312a-312(n), 314a-314(n), and 316a-316(n) through switch control bus 330 to sequence through a plurality of different combinations of sensor elements 320a-320(n) and reference elements 322a-322(n) to provide different states of a Wheatstone bridge configuration. By monitoring the pressure readings, which should remain within a tolerance band around the average pressure, failed sensor elements and failed reference elements can be identified. In one embodiment, failed sensor elements and failed reference elements are disabled by their associated switches. In this case, additional non defective sensor elements and/or reference elements may also be disabled to balance the Wheatstone bridge so that pressure readings can continue to be obtained. In another embodiment, pressure sensor 300 includes spare sensor elements and spare reference elements that may be used to replace failed sensor elements and failed reference elements. In this case, the number of sensor elements and reference elements used in the Wheatstone bridge is not reduced in response to a disabled failed sensor element or a disabled failed reference element.

Figure 7:
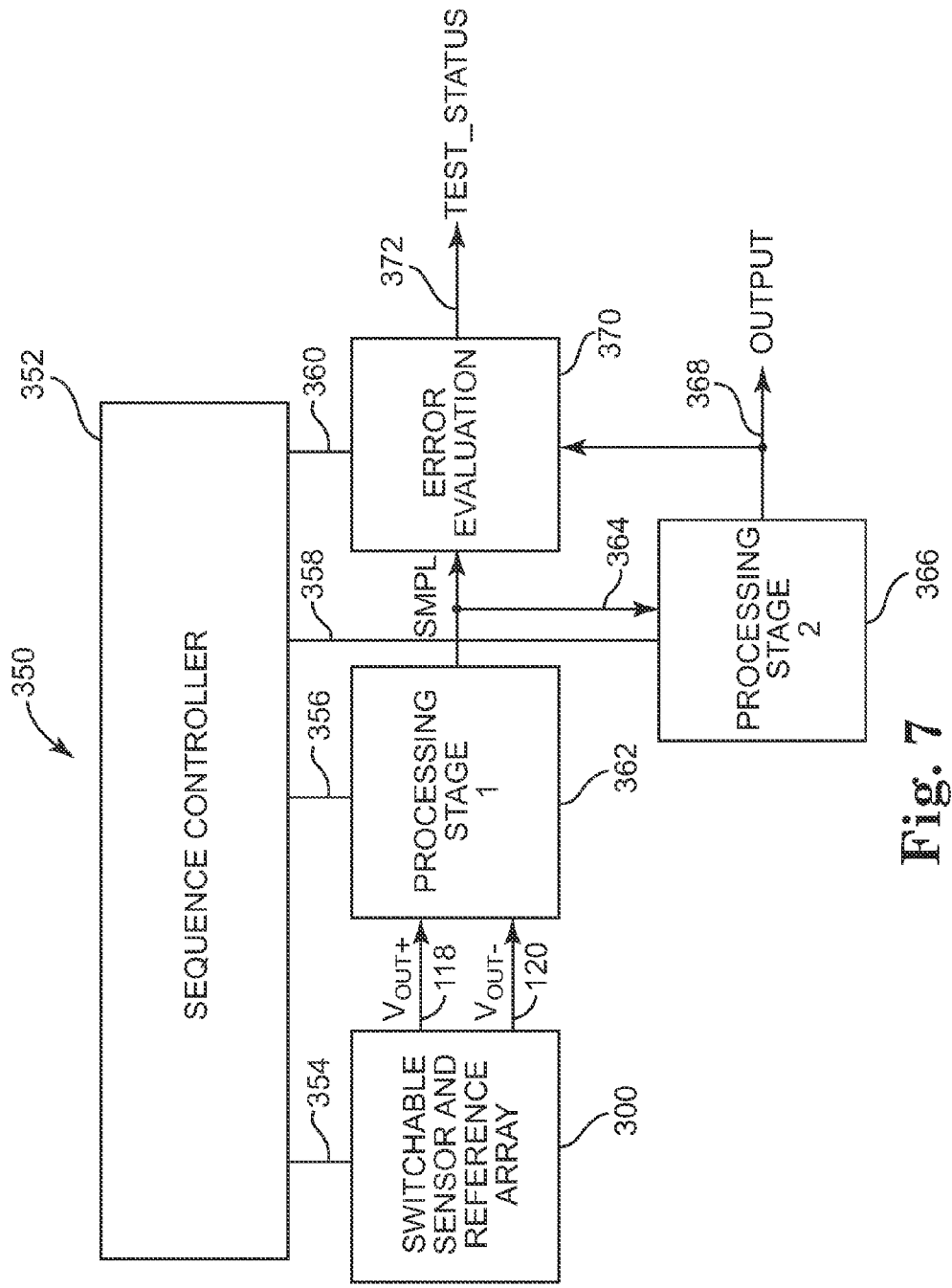
FIG. 7 is a block diagram illustrating one embodiment of a pressure sensor system.

FIG. 7 is a block diagram illustrating one embodiment of a pressure sensor system 350. Pressure sensor system 350 includes a sequence controller 352, a switchable sensor and reference array 300, a first processing stage 362, a second processing stage 366, and an error evaluation stage 370. Sequence controller 352 is electrically coupled to switchable sensor and reference array 300 through signal path 354. Sequence controller 352 is electrically coupled to first processing stage 362 through signal path 356. Sequence controller 352 is electrically coupled to second processing stage 366 through signal path 358. Sequence controller 352 is electrically coupled to error evaluation stage 370 through signal path 360.

In one embodiment, switchable sensor and reference array 300 is the pressure sensor previously described and illustrated with reference to FIG. 6. Switchable sensor and reference array 300 is electrically coupled to first processing stage 362 through $V_{OUT+}$ signal path 118 and $V_{OUT-}$ signal path 120. First processing stage 362 is electrically coupled to second processing stage 366 and error evaluation stage 370 through sample (SMPL) signal path 364. Second processing stage 366 is electrically coupled to error evaluation stage 370 and provides an output signal through output signal path 368. Error evaluation stage 370 provides a test status signal through test status signal path 372.

Sequence controller 352 controls switchable sensor and reference array 300, first processing stage 362, second processing stage 366, and error evaluation stage 370. In one embodiment, sequence controller 352 is a state machine. Sequence controller 352 controls switchable sensor and reference array 300 to sequence through the different combinations of sensor elements and reference elements for the states of the Wheatstone bridge.

In each state, switchable sensor and reference array 300 outputs a bridge voltage pressure sensor signal between $V_{OUT+}$ signal path 118 and $V_{OUT-}$ signal path 120. First processing stage 362 receives the bridge voltage pressure sensor signal between $V_{OUT+}$ signal path 118 and $V_{OUT-}$ signal path 120 and converts the bridge voltage pressure sensor signal to a digital pressure sensor signal. In one embodiment, first processing stage 362 includes an analog-to-digital converter (ADC) for converting the bridge voltage pressure sensor signal to the digital pressure sensor signal. In one embodiment, the gain of first processing stage 362 is adjusted by sequence controller 352 to compensate for a reduced number of sensor elements and/or reference elements in the Wheatstone bridge due to a failure of one or more of the sensor elements and/or reference elements. First processing stage 362 outputs the digital pressure sensor signal on sample signal path 364.

Second processing stage 366 receives the digital pressure sensor signal on sample signal path 364 and filters the digital pressure sensor signal to provide an average pressure signal. Second processing stage 366 removes the variations in the signal that are caused by the Wheatstone bridge reconfigurations. In one embodiment, second processing stage 366 includes a low-pass filter for filtering the digital pressure sensor signal to provide the average pressure signal. In one embodiment, the gain of second processing stage 366 is adjusted by sequence controller 352 to compensate for a reduced number of sensor elements and/or reference elements in the Wheatstone bridge due to a failure of one or more of the sensor elements and/or reference elements. Second processing stage 366 outputs the average pressure signal on output signal path 368.

Error evaluation stage 370 receives the digital pressure sensor signal on sample signal path 364 and the average pressure signal on output signal path 368 to provide a test status signal. Error evaluation stage 370 compares the digital pressure sensor signal to the average pressure signal to determine whether the sample is within a tolerance band of the average pressure signal. If the sample is within the tolerance band of the average pressure signal, error evaluation stage 370 outputs a signal on test status signal path 372 indicating the last switched sensor element or reference element is functioning properly. If the sample is not within the tolerance band of the average pressure signal, error evaluation stage 370 outputs a signal on test status signal path 372 indicating the last switched sensor element or reference element is not functioning properly. In one embodiment, if a sensor element or reference element is not functioning properly, sequence controller 352 isolates the failed sensor element or reference element. In this case, sequence controller 352 also isolates additional sensor elements and/or reference elements to balance the Wheatstone bridge. The pressure sensor then continues operating without the disabled elements.

Embodiments provide pressure sensors where sensor elements and/or reference elements may be switched between left and right branches and between upper and lower portions of a Wheatstone bridge during operation of the pressure sensors. The switching enables online testing of the sensor elements and reference elements. Therefore, a separate offline test mode for testing the sensor elements and reference elements is not needed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device comprising:
   a first pressure sensor element arranged in a first branch of a Wheatstone bridge configuration;
   a second pressure sensor element;
   a first reference element;
   a second reference element; and
   a circuit configured to selectively switch the first and second pressure sensor element into the first branch of the Wheatstone bridge configuration.

2. The semiconductor device of claim 1, further comprising:
   a first switch matrix configured to selectively electrically couple a first side of the first pressure sensor element to one of a first reference voltage and a second reference voltage;
   a second switch matrix configured to selectively electrically couple a second side of the first pressure sensor element to one of a first output node and a second output node;
   a third switch matrix configured to selectively electrically couple a first side of the second pressure sensor element to one of the first reference voltage and the second reference voltage;
   a fourth switch matrix configured to selectively electrically couple a second side of the second pressure sensor element to one of the first output node and the second output node;
   a fifth switch matrix configured to selectively electrically couple a first side of the first reference element to one of the first reference voltage and the second reference voltage; and
   a sixth switch matrix configured to selectively electrically couple a first side of the second reference element to one of the first reference voltage and the second reference voltage,
   wherein the second switch matrix is configured to selectively electrically couple a second side of the first reference element to one of the first output node and the second output node,
   wherein the fourth switch matrix is configured to selectively electrically couple a second side of the second reference element to one of the first output node and the second output node, and
   wherein the first and second pressure sensor elements and the first and second reference elements are arranged in the Wheatstone bridge configuration.

3. The semiconductor device of claim 2, further comprising:
a third pressure sensor element;
a seventh switch matrix configured to selectively electrically couple a first side of the third pressure sensor element to one of the first reference voltage and the second reference voltage;
an eighth switch matrix configured to selectively electrically couple a second side of the third pressure sensor element to one of the first output node and the second output node;
a fourth pressure sensor element;
a ninth switch matrix configured to selectively electrically couple a first side of the fourth pressure sensor element to one of the first reference voltage and the second reference voltage;
a tenth switch matrix configured to selectively electrically couple a second side of the second pressure sensor element to one of the first output node and the second output node;
a third reference element;
a fourth reference element;
an eleventh switch matrix configured to selectively electrically couple a first side of the third reference element to one of the first reference voltage and the second reference voltage; and
a twelfth switch matrix configured to selectively electrically couple a first side of the fourth reference element to one of the first reference voltage and the second reference voltage,
wherein the eighth switch matrix is configured to selectively electrically couple a second side of the third reference element to one of the first output node and the second output node, and
wherein the tenth switch matrix is configured to selectively electrically couple a second side of the fourth reference element to one of the first output node and the second output node.

4. The semiconductor device of claim 1, wherein the first pressure sensor element comprises a first diaphragm configured to deflect in response to applied pressure, and
wherein the second pressure sensor element comprises a second diaphragm configured to deflect in response to applied pressure.

5. The semiconductor device of claim 4, wherein the first reference element comprises a third diaphragm and a first pillar that prevents the third diaphragm from deflecting in response to applied pressure, and
wherein the second reference element comprises a fourth diaphragm and a second pillar that prevents the fourth diaphragm from deflecting in response to applied pressure.

6. The semiconductor device of claim 2, wherein the first reference voltage comprises a positive reference voltage, and
wherein the second reference voltage comprises a negative reference voltage.

7. The semiconductor device of claim 2, wherein the first output node comprises a positive voltage output node, and
wherein the second output node comprises a negative voltage output node.

8. The semiconductor device of claim 2, wherein the first, second, third, and fourth matrix switches are configured to sequence such that the first and second pressure sensor elements are switched into each position in the Wheatstone bridge configuration.

9. The semiconductor device of claim 8, further comprising:
a circuit configured to determine if one of the first and second pressure sensor elements has failed by comparing the voltage between the first and second output nodes to a tolerance band during the sequencing of the first, second, third, and fourth matrix switches.

10. A semiconductor device comprising:
an array of pressure sensor elements;
an array of reference elements;
an array of first switches, each first switch configured to selectively electrically couple a pressure sensor element to a first reference voltage;
an array of second switches, each second switch configured to selectively electrically couple a pressure sensor element to a second reference voltage;
an array of third switches, each third switch configured to selectively electrically couple a pressure sensor element to a first output node;
an array of fourth switches, each fourth switch configured to selectively electrically couple a pressure sensor element to a second output node,
wherein the array of first switches, the array of second switches, the array of third switches, and the array of fourth switches are configured to switch the array of pressure sensor elements and the array of reference elements into a Wheatstone bridge configuration.

11. The semiconductor device of claim 10, further comprising:
an array of fifth switches, each fifth switch configured to selectively electrically couple a reference element to the first reference voltage;
an array of sixth switches, each sixth switch configured to selectively electrically couple a reference element to the second reference voltage;
an array of seventh switches, each seventh switch configured to selectively electrically couple a reference element to the first output node; and
an array of eighth switches, each eighth switch configured to selectively electrically couple a reference element to the second output node.

12. The semiconductor device of claim 10, wherein each pressure sensor element comprises a diaphragm configured to deflect in response to applied pressure.

13. The semiconductor device of claim 12, wherein each reference element comprises a diaphragm and a pillar that prevents the diaphragm from deflecting in response to applied pressure.

14. The semiconductor device of claim 10, wherein the first reference voltage comprises a positive reference voltage, and
wherein the second reference voltage comprises a negative reference voltage.

15. The semiconductor device of claim 10, wherein the first output node comprises a positive voltage output node, and
wherein the second output node comprises a negative voltage output node.

16. The semiconductor device of claim 10, further comprising:
a sequence controller configured for switching the sensor elements and the reference elements through multiple states of the Wheatstone bridge configuration.

17. The semiconductor device of claim 16, further comprising:
an error evaluation stage configured to determine if a pressure sensor element or a reference element has failed by comparing the voltage between the first and second output nodes to a tolerance band during the switching of the sensor elements and the reference elements through the multiple states of the Wheatstone bridge configuration.

18. A method for operating a semiconductor device, the method comprising:
providing a first pressure sensor element arranged in a first branch of a Wheatstone bridge configuration;
providing a second pressure sensor element;
providing a first reference element and a second reference element; and
selectively switching the first and second pressure sensor element into the first branch of the Wheatstone bridge configuration.

19. A method for operating a semiconductor device, the method comprising:
sequencing a first pressure sensor element to be electrically coupled between a first reference voltage and a first output node and between a second reference voltage and a second output node in a Wheatstone bridge configuration;
sequencing a second pressure sensor element to be electrically coupled between the second reference voltage and the second output node and between the first reference voltage and the first output node in the Wheatstone bridge configuration, the second pressure sensor opposite the first pressure sensor in the Wheatstone bridge configuration;
electrically coupling a first reference element between the second reference voltage and the first output node;
electrically coupling a second reference element between the first reference voltage and the second output node; and
comparing the voltage between the first and second output nodes to a tolerance band during the sequencing of the first and second pressure sensor elements to determine if one of the first and second pressure sensor elements has failed.

20. The method of claim 19, further comprising:
sequencing the first reference element to be electrically coupled between the second reference voltage and the first output node and between the first reference voltage and the second output node in the Wheatstone bridge configuration;
sequencing the second reference element to be electrically coupled between the first reference voltage and the second output node and between the second reference voltage and the first output node in the Wheatstone bridge configuration, the second reference element opposite the first reference element in the Wheatstone bridge configuration; and
comparing the voltage between the first and second output nodes to a tolerance band during the sequencing of the first and second reference elements to determine if one of the first and second reference elements has failed.

21. The method of claim 19, wherein the first pressure sensor element comprises a first diaphragm configured to deflect in response to applied pressure,
wherein the second pressure sensor element comprises a second diaphragm configured to deflect in response to applied pressure,
wherein the first reference element comprises a third diaphragm and a first pillar that prevents the third diaphragm from deflecting in response to applied pressure, and
wherein the second reference element comprises a fourth diaphragm and a second pillar that prevents the fourth diaphragm from deflecting in response to applied pressure.

* * * * *